(12) United States Patent
Kong et al.

(10) Patent No.: US 12,131,227 B2
(45) Date of Patent: Oct. 29, 2024

(54) METHOD AND APPARATUS FOR DETERMINING MULTI-QUBIT MEASUREMENT RESULT, AND QUANTUM COMPUTER

(71) Applicant: Origin Quantum Computing Technology (Hefei) Co., Ltd, Hefei (CN)

(72) Inventors: Weicheng Kong, Hefei (CN); Hanqing Shi, Hefei (CN)

(73) Assignee: Origin Quantum Computing Technology (Hefei) Co., Ltd, Hefei (CN)

( * ) Notice: Subject to any disclaimer, the term of this patent is extended or adjusted under 35 U.S.C. 154(b) by 0 days.

(21) Appl. No.: 18/501,853

(22) Filed: Nov. 3, 2023

(65) Prior Publication Data

US 2024/0265290 A1 Aug. 8, 2024

Related U.S. Application Data

(63) Continuation of application No. PCT/CN2022/098712, filed on Jun. 14, 2022.

(30) Foreign Application Priority Data

Jun. 30, 2021 (CN) .......................... 202110739831.0
Jun. 30, 2021 (CN) .......................... 202110739832.5

(51) Int. Cl.
*G06N 10/60* (2022.01)

(52) U.S. Cl.
CPC .................... *G06N 10/60* (2022.01)

(58) Field of Classification Search
CPC ..................................................... G06N 10/60
See application file for complete search history.

(56) References Cited

U.S. PATENT DOCUMENTS

2021/0049482 A1 2/2021 Mezzacapo et al.
2022/0391705 A1* 12/2022 Kerenidis ................ G06N 3/08

FOREIGN PATENT DOCUMENTS

| CN | 108805293 A | 11/2018 |
| CN | 109447271 A | 3/2019 |
| CN | 110097014 A | 8/2019 |
| CN | 111369003 A | 7/2020 |
| CN | 113011591 A | 6/2021 |

OTHER PUBLICATIONS

International Search Report issued in corresponding PCT Application No. PCT/CN2022/098712, dated Aug. 10, 2022.
Written Opinion issued in corresponding PCT Application No. PCT/CN2022/098712, dated Aug. 10, 2022.

* cited by examiner

*Primary Examiner* — Walter L Lindsay, Jr.
*Assistant Examiner* — Geoffrey T Evans
(74) *Attorney, Agent, or Firm* — Westbridge IP LLC (57) ABSTRACT

Disclosed are a method and an apparatus for determining a multi-qubit measurement result, and a quantum computer. In the method, during determining multi-qubit measurement results, qubit readout feedback signals are first acquired for N associated qubits, then quantum state measurement values of the respective qubits are acquired based on the qubit readout feedback signals, and finally, measurement results of the N associated qubits are determined based on information weights of the respective qubits and the quantum state measurement values of the respective qubits.

11 Claims, 7 Drawing Sheets

Acquiring a distribution pattern of the coordinate point data in the IQ coordinate system, where the distribution pattern includes a first pattern corresponded when a qubit is in the first quantum state and a second pattern corresponded when a qubit is in the second quantum state — S2031

Acquiring central positions of the first pattern and the second pattern, respectively — S2032

Determining a perpendicular bisector of a line connecting the two central positions as the second quantum state criterion — S2033

METHOD AND APPARATUS FOR DETERMINING MULTI-QUBIT MEASUREMENT RESULT, AND QUANTUM COMPUTER

CROSS-REFERENCE TO RELATED APPLICATIONS

This application is a continuation of International Application No. PCT/CN2022/098712, filed on Jun. 14, 2022, which claims priority to Chinese Patent Application No. CN202110739832.5, filed on Jun. 30, 2021, entitled "METHOD AND APPARATUS FOR DETERMINING MULTI-QUBIT MEASUREMENT RESULT, AND QUANTUM COMPUTER", and Chinese Patent Application No. CN202110739831.0, filed on Jun. 30, 2021 and entitled "METHOD AND APPARATUS FOR DETERMINING MULTI-QUBIT MEASUREMENT RESULT, AND QUANTUM COMPUTER". The disclosures of the aforementioned applications are hereby incorporated by reference in their entireties.

TECHNICAL FIELD

The present disclosure belongs to the field of quantum measurement and control technologies, and in particular, to a method and an apparatus for determining a multi-qubit measurement result, and a quantum computer.

BACKGROUND

Qubit information refers to a quantum state of a qubit, and basic quantum states are state $|0\rangle$ and state $|1\rangle$. After the qubit is operated, the quantum state of the qubit changes. It is reflected that on a quantum chip, after the quantum chip is executed, a quantum state of the qubit changes, that is, execution result of the quantum chip is obtained. The execution result is carried and transmitted by a qubit readout signal (generally an analog signal).

A process of rapidly measuring a qubit quantum state by using a qubit readout signal is a key work for understanding execution performance of a quantum chip. High accuracy of a qubit measurement result is always an important index continuously pursued in the quantum computing industry. In conventional technologies, a relatively mature technology is determining a measurement result of a single qubit that is not affected by other qubits. However, a plurality of associated qubits have a more practical and extensive application prospect. For example, there are two associated qubits for running a dual quantum logic gate or a plurality of associated qubits for running a plurality of quantum logic gates. For another example, there are a plurality of associated qubits for running a quantum computing task. In these examples, determination of measurement results of a plurality of associated qubits is of particular importance. Up to now, there is no relevant technique regarding a method for determining measurement results of a plurality of associated qubits. Therefore, how to implement measurement on a plurality of associated qubits and also ensure accuracy of measurement results is a problem to be solved urgently at present.

SUMMARY

An objective of the present disclosure is to provide a method and an apparatus for determining a multi-qubit measurement result, and a quantum computer, to solve a problem in conventional technologies that measurement results of a plurality of associated qubits cannot be accurately determined, so that a plurality of associated qubits may be applied.

According to a first aspect, an embodiment provides a method for determining a multi-qubit measurement result, including: acquiring qubit readout feedback signals for N associated qubits, where N is an integer greater than or equal to 2; acquiring quantum state measurement values of the respective qubits based on the qubit readout feedback signals; and determining measurement results of the N associated qubits based on information weights of the respective qubits and the quantum state measurement values of the respective qubits.

According to a second aspect, an embodiment provides a method for determining a multi-qubit measurement result, including: acquiring quantum state measurement values of respective qubits based on qubit readout feedback signals that are read out simultaneously for N associated qubits, where N is an integer greater than or equal to 2; determining measurement result eigenvalues and measurement result frequency values of the N associated qubits based on the information weights of the respective qubits and the quantum state measurement values of the respective qubits, where the information weights of the respective qubits are set based on a bit of the qubits; correcting measurement result fidelity based on the measurement result eigenvalues; and correcting the measurement result frequency values based on corrected measurement result fidelity to obtain multi-qubit measurement results.

Optionally, the acquiring quantum state measurement values of respective qubits based on qubit readout feedback signals that are read out simultaneously for N associated qubits includes: acquiring the qubit readout feedback signals that are read out simultaneously a plurality of times for the N associated qubits; and obtaining quantum state measurement values, corresponding to the respective qubit readout feedback signals, of the respective qubits.

Optionally, the obtaining quantum state measurement values, corresponding to the respective qubit readout feedback signals, of the respective qubits includes: establishing a first quantum state criterion for the N associated qubits; and acquiring the quantum state measurement values of the respective qubits based on the first quantum state criterion and the qubit readout feedback signals.

Optionally, the determining measurement result eigenvalues and measurement result frequency values of the N associated qubits based on the information weights of the respective qubits and the quantum state measurement values of the respective qubits includes: obtaining the measurement result eigenvalues based on the information weights of the respective qubits and the quantum state measurement values of the respective qubits; and determining N associated measurement result frequency values based on frequencies of occurrence of the measurement result eigenvalues in a plurality of times of simultaneous readings.

Optionally, the correcting measurement result fidelity based on the measurement result eigenvalues includes: determining, based on the measurement result eigenvalues, logical gate sequences that are corresponding to the respective measurement result eigenvalues and that are to be acted on the N associated qubits; and using measurement results obtained when all the logical gate sequences respectively act on the N qubits as corrected measurement result fidelity.

Optionally, the determining, based on the measurement result eigenvalues, logical gate sequences that are corresponding to the respective measurement result eigenvalues and that are to be acted on the multi-qubits includes: determining, based on qubit information weights, specific values of quantum state eigenvalues corresponding to each qubit in the measurement result eigenvalues; when a specific value of the quantum state eigenvalue is |1⟩, setting a logic gate to be acted on a corresponding qubit to an X gate; when a specific value of the quantum state eigenvalue is |0⟩, setting a logic gate to be acted on a corresponding qubit to an I gate; and determining, according to a setting rule, the logical gate sequences that are corresponding to the respective measurement result eigenvalues and that are to be acted on the multi-qubits.

Optionally, the using measurement results obtained when all the logical gate sequences respectively act on the N qubits as corrected measurement result fidelity includes: sequentially obtaining measurement results obtained when the respective logical gate sequences act on the N qubits; and obtaining a measurement result frequency value, in the measurement results, corresponding to a measurement result eigenvalue that corresponds to a current logical gate sequence, and using the measurement result frequency value as measurement result fidelity of the current logical gate sequence.

According to a third aspect, an embodiment provides an apparatus for determining a multi-qubit measurement result, including: a first acquisition module, configured to acquire qubit readout feedback signals for N associated qubits, where N is an integer greater than or equal to 2; a second acquisition module, configured to acquire quantum state measurement values of the respective qubits based on the qubit readout feedback signals; and a determining module, configured to determine measurement results of the N associated qubits based on information weights of the respective qubits and the quantum state measurement values of the respective qubits.

According to a fourth aspect, an embodiment provides an apparatus for determining a multi-qubit measurement result, including: a first acquisition module, configured to acquire quantum state measurement values of respective qubits based on qubit readout feedback signals that are read out simultaneously for N associated qubits, where N is an integer greater than or equal to 2; a first determining module, configured to determine measurement result eigenvalues and measurement result frequency values of the N associated qubits based on information weights of the respective qubits and the quantum state measurement values of the respective qubits, where the information weights of the respective qubits are set based on a bit of the qubits; a first correction module, configured to correct measurement result fidelity based on the measurement result eigenvalues; and a second correction module, configured to correct the measurement result frequency values based on corrected measurement result fidelity to obtain multi-qubit measurement results.

According to a fifth aspect, an embodiment provides a storage medium, where the storage medium stores a computer program. When the computer program is set to run, a method described above is performed.

According to a sixth aspect, an embodiment provides a quantum computer, configured to perform quantum computing by using the foregoing method for determining a multi-qubit measurement result, or including the foregoing apparatus for determining a multi-qubit measurement result.

In an embodiment, measurement results of a plurality of associated qubits may be determined, so that a plurality of associated qubits may be applied, improving practicality of the plurality of associated qubits, and expanding application scenarios of the plurality of associated qubits.

In an embodiment, accuracy of multi-qubit measurement results is improved by correcting fidelity and correcting measurement results based on the fidelity, and a plurality of associated qubits may be applied, having higher practicability and wider application scenarios.

BRIEF DESCRIPTION OF THE DRAWINGS

To describe the technical solutions in the embodiments or in the conventional technology more clearly, the following briefly describes the accompanying drawings required for describing the embodiments or the conventional technology. Apparently, the accompanying drawings in the following description only show some embodiments of the present disclosure, and a person of ordinary skill in the art may still derive other drawings from these accompanying drawings without creative efforts.

DETAILED DESCRIPTIONS OF THE EMBODIMENTS

The following further describes in detail a method and an apparatus for determining a multi-qubit measurement result, and a quantum computer that are proposed herein with reference to the accompanying drawings and specific embodiments. The advantages and features of the embodiments will be more apparent based on the following descriptions. It should be noted that the accompanying drawings are all in a very simplified form and use a non-accurate proportion, and are merely used to conveniently and clearly assist in describing the objectives of the embodiments.

In the description of the present disclosure, the terms "first" and "second" are merely intended for a purpose of description, and shall not be understood as an indication or implication of relative importance or implicit indication of the number of indicated technical features. Therefore, the features defined by "first" and "second" may indicate or imply that one or more of the features are included. In the descriptions of the present disclosure, "a plurality of" means at least two, for example, two or three, unless otherwise specifically stated.

Figure 1:
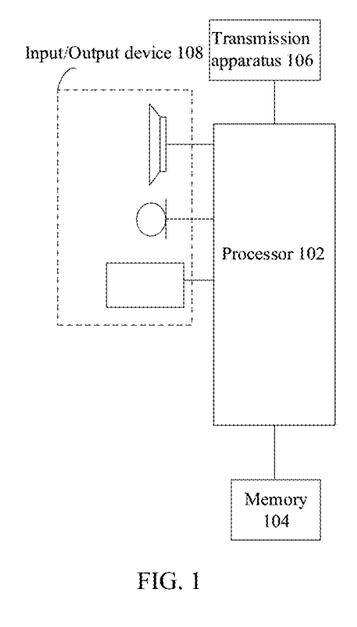
FIG. 1 is a hardware structural block diagram of a computer terminal for implementing a method for determining a multi-qubit measurement result according to an embodiment.

A method provided in the embodiments may be executed in a computer terminal or a similar operation apparatus. For example, a method is run on a computer terminal. Referring to FIG. 1, the computer terminal may include one or more (only one shown in FIG. 1) processors 102 (the processor 102 may include but is not limited to a processing apparatus such as a microprocessor MCU or a programmable logic device FPGA) and a memory 104 configured to store data. Optionally, the computer terminal may further include a transmission apparatus 106 and an input/output device 108 for implementing a communications function. A person of ordinary skill in the art may understand that the structure shown in FIG. 1 is merely an example and does not constitute any limitation on a structure of the computer terminal. For example, the computer terminal may alternatively include more or fewer components than those shown in FIG. 1, or have a configuration different from that shown in FIG. 1.

The memory 104 may be configured to store a software program and a module of an application software, for example, a program instruction/module corresponding to a method for determining a multi-qubit measurement result provided in the present application. The processor 102 executes various function applications and data processing by running the software program and the module that are stored in the memory 104, that is, implements the foregoing method. The memory 104 may include a high-speed random access memory, and may further include a non-volatile solid-state memory. In some embodiments, the memory 104 may further include a memory 104 remotely disposed relative to the processor 102, which may be connected to a computer terminal over a network. Examples of the network include but are not limited to the Internet, a corporate intranet, a local area network, a mobile communication network, and a combination thereof.

The transmission apparatus 106 is configured to receive or send data over a network. A specific example of the network may include a wireless network provided by a communication provider of a computer terminal. In an embodiment, the transmission apparatus includes a network interface controller (Network Interface Controller, NIC) that may be connected to another network device by using a base station, so as to communicate with the Internet. In an embodiment, the transmission apparatus 106 may be a radio frequency (Radio Frequency, RF) module. The radio frequency module is configured to communicate with the Internet in a wireless manner.

The method provided in the embodiments may be applied to the foregoing computer terminal, which is also referred to as a quantum computer.

Figure 2:
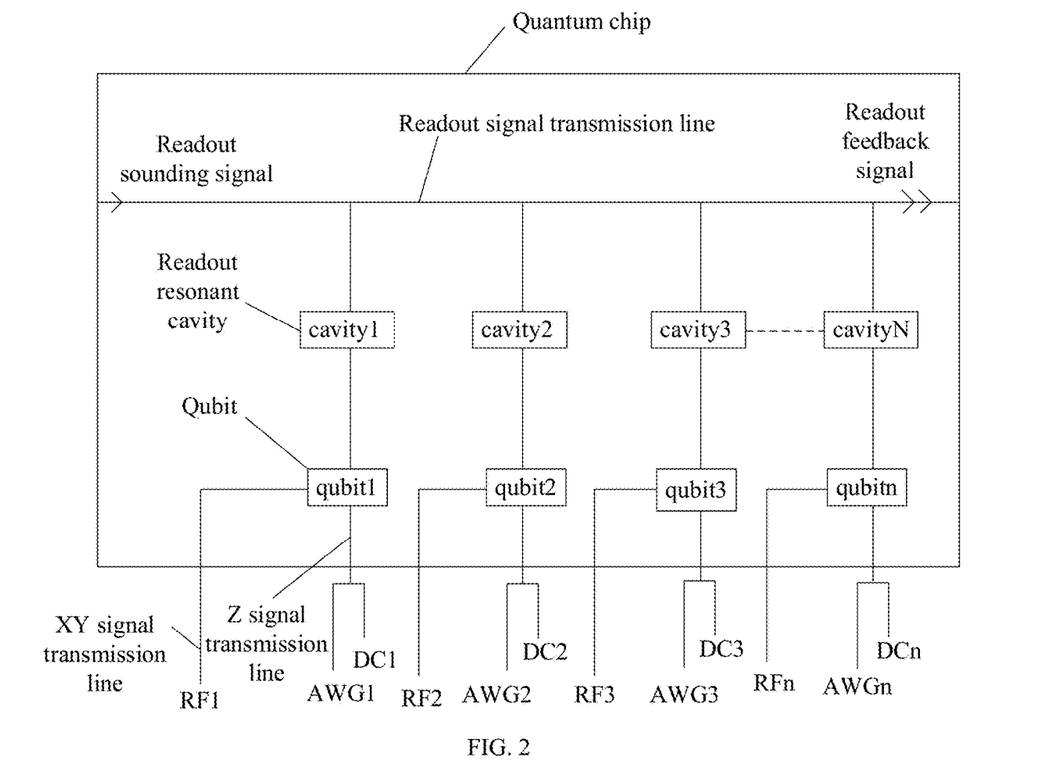
FIG. 2 is a schematic structural diagram of a superconducting quantum chip according to an embodiment.

In the quantum computer, a quantum chip is a processor for executing quantum computing. Referring to FIG. 2, a quantum chip is integrated with a plurality of qubits and a plurality of readout resonant cavities that are in a one-to-one correspondence and mutually coupled with each other. A terminal, away from a corresponding qubit, of each readout resonant cavity is connected to a readout signal transmission line integrated on the quantum chip, and each qubit is coupled with an XY signal transmission line and a Z signal transmission line. The XY signal transmission line is configured to receive a quantum state control signal, and the Z signal transmission line is configured to receive a magnetic flux control signal. The magnetic flux control signal includes a bias voltage signal and/or a pulse bias control signal, and both the bias voltage signal and the pulse bias control signal may regulate a frequency of the qubit. The readout signal transmission line is configured to receive a readout sounding signal and transmit a readout feedback signal.

Control and processing processes of qubits are described as follows.

A frequency of a qubit is adjusted to an operating frequency by using a magnetic flux control signal on a Z signal transmission line. In this case, a quantum state control signal is applied by using an XY signal transmission line to perform quantum state control on a qubit that is in an initial state, and a quantum state of the qubit obtained after the control is read out by using a readout resonant cavity. Specifically, a readout signal transmission line is used to apply a carrier pulse signal, which is generally referred to as a readout sounding signal. The readout sounding signal is generally a microwave signal with a frequency ranging from 4 GHz to 8 GHz, and the quantum state of the qubit is determined by parsing a readout feedback signal output by the readout signal transmission line. A fundamental reason why a readout resonant cavity can read a quantum state of a qubit is that different quantum states of the qubit have different dispersion shifts to the readout resonant cavity, so that different quantum states of the qubit have different responses to a readout sounding signal applied to the readout resonant cavity, and the response signal is referred to as a readout feedback signal. Only when a carrier frequency of the readout sounding signal of the qubit is very close to a natural frequency (also referred to as a resonance frequency) of the readout resonant cavity, the readout resonant cavity has an obviously different response to the readout sounding signal due to different quantum states of the qubit, that is, the readout feedback signal has a maximum distinguishability. Based on this, a quantum state of the qubit is determined by parsing a readout feedback signal in a specific pulse length. For example, a readout feedback signal collected each time is converted into a coordinate point of an orthogonal plane coordinate system (namely, an I-Q plane coordinate system), and a corresponding quantum state is determined as state |0⟩ or state |1⟩ based on a position of the coordinate point. It may be understood that the state |0⟩ and the state |1⟩ are two eigenstates of a qubit.

Herein, a method and an apparatus for determining a multi-qubit measurement result, and a quantum computer are provided, to determine measurement results of a plurality of associated qubits, so that a plurality of associated qubits may be applied, practicality of the plurality of associated qubits is improved, and application scenarios of the plurality of associated qubits are expanded.

Figure 3:
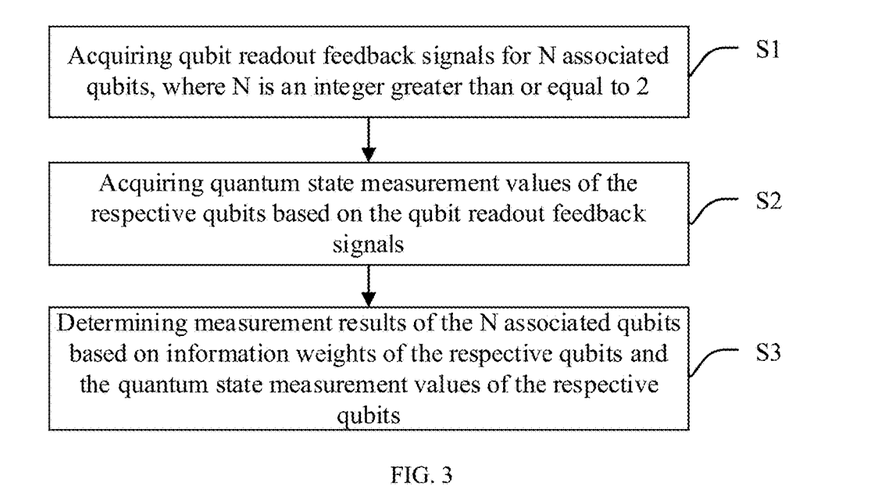
FIG. 3 is a schematic flowchart of a method for determining a multi-qubit measurement result according to an embodiment.

An embodiment provides a method for determining a multi-qubit measurement result. Referring to FIG. 3, the determining method includes the following steps.

Step S1: Acquiring qubit readout feedback signals for N associated qubits, where N is an integer greater than or equal to 2.

Specifically, the qubit readout feedback signals are obtained from a readout signal transmission line, and represent signals of measurement results for the N associated qubits. It should be noted that, the qubit readout feedback signals are analog signals, and a form of the analog signals includes but is not limited to:

$$S = A\cos(\omega t + \varphi) = \frac{A}{2}\left[e^{-i(\omega t + \varphi)} + e^{-(\omega t + \varphi)}\right].$$

A person skilled in the art may understand that the form is a general representation of the analog signal, and therefore, a parameter in the representation is not described herein. Digital processing, including but not limited to frequency mixing and/or integration processing, is performed on the signals to obtain corresponding complex signals that include a quantum state. In this embodiment, an example in which N is equal to 3 is used, that is, determining measurement results of three qubits. In this case, the qubit readout feedback signals include quantum state information of three associated qubits.

Step S2: Acquiring quantum state measurement values of the respective qubits based on the qubit readout feedback signals.

Specifically, the qubit readout feedback signals carry quantum state information of the N associated qubits. Different qubits require different frequencies of readout sounding signals, and different qubits have different responses to readout sounding signals that are applied to readout cavities corresponding to the qubits. Therefore, compared with a readout feedback signal for a conventional single qubit, the qubit readout feedback signals for the N associated qubits include more information, and the information is more complicated. During reading and measurement of the quantum state information, the qubit readout feedback signals are processed to obtain the quantum state measurement values of the N associated qubits.

Step S3: Determining measurement results of the N associated qubits based on information weights of the respective qubits and the quantum state measurement values of the respective qubits.

Specifically, the information weights of the respective qubits are set based on a bit of the qubits. For example, when a value of N is 3, a set of three qubits needs to be obtained and used as a first bit.

For example, before the quantum state measurement values of the respective qubits are obtained based on the qubit readout feedback signals, a first quantum state criterion for the N associated qubits may be established, and the first quantum state criterion is used to acquire the quantum state measurement values of the respective qubits based on the qubit readout feedback signals.

The inventors find that a specific step of performing quantum state resolution on qubit readout feedback signals that include quantum state information may be implemented by establishing a first quantum state criterion. Specifically, carrier pulse signals (readout sounding signals) are applied to qubits, and qubit readout feedback signals output by a readout signal transmission line are measured to obtain corresponding quantum state information and the corresponding quantum state information is recorded. By applying different carrier pulse signals (readout sounding signals) and repeating the process, measurement results that can represent the respective qubit readout feedback signals are obtained, and the first quantum state criterion is generated based on the measurement results.

In specific application, as long as a collected qubit feedback signal is input into the first quantum state criterion, quantum state information corresponding to the qubit feedback signal may be obtained, so that a resolution process for multi-qubit quantum states is implemented, reducing quantum computing steps and improving quantum computing efficiency.

Figure 4:
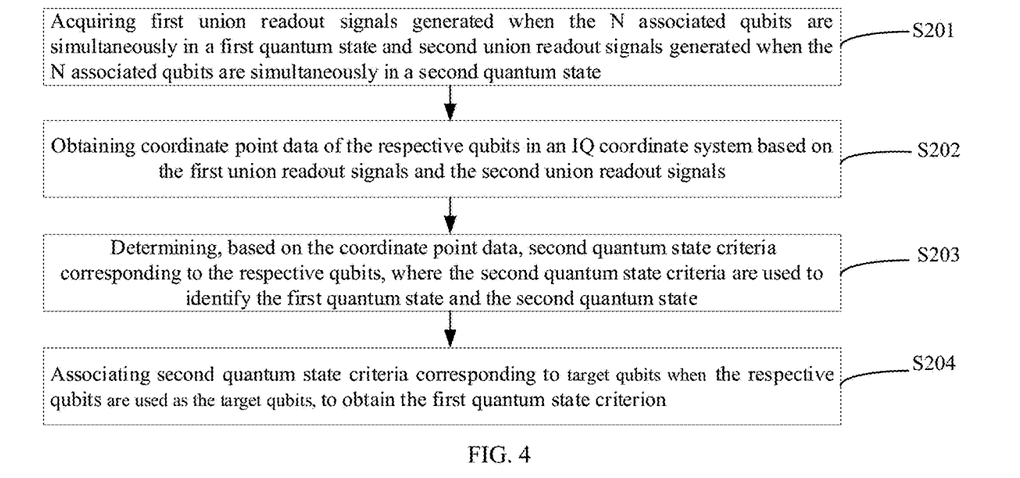
FIG. 4 is a schematic flowchart of a method for establishing a first quantum state criterion for N associated qubits according to an embodiment.

For example, referring to FIG. 4, the establishing a first quantum state criterion for the N associated qubits includes the following steps.

Step S201: Acquiring first union readout signals generated when the N associated qubits are simultaneously in a first quantum state and second union readout signals generated when the N associated qubits are simultaneously in a second quantum state.

Specifically, in specific implementation of the inventors, a first quantum state control signal is first applied to the N associated qubits simultaneously, so that each qubit is in the first quantum state, and quantum state information of the qubits is read to obtain respective first union readout signals. Similarly, a second quantum state control signal is then applied to the N associated qubits simultaneously, so that each qubit is in the second quantum state, and quantum state information of the qubits is read to obtain respective second union readout signals.

The first union readout signals are qubit readout feedback signals generated when the N associated qubits are in the first quantum state. The second union readout signals are qubit readout feedback signals generated when the N associated qubits are in the second quantum state.

Step S202: Obtaining coordinate point data of the respective qubits in an IQ coordinate system based on the first union readout signals and the second union readout signals.

Specifically, IQ orthogonal demodulation processing is performed on the first union readout signals to obtain two corresponding values I and Q, where the two values correspondingly form a set of coordinate point data in the IQ coordinate system.

Similarly, IQ orthogonal demodulation processing is performed on the second union readout signals to obtain two corresponding values I and Q, where the two values correspondingly form a set of coordinate point data in the IQ coordinate system.

Step S203: Determining, based on the coordinate point data, second quantum state criteria corresponding to the respective qubits, where the second quantum state criteria are used to identify the first quantum state and the second quantum state.

Specifically, after IQ orthogonal demodulation processing is separately performed on the first union readout signals and the second union readout signals, corresponding coordinate point data may be obtained in the IQ coordinate system. Through a large number of repeated tests, a plurality of coordinates in the IQ coordinate system may be obtained. Coordinate point data corresponding to the first union readout signals forms an area range value in the IQ coordinate system, and coordinate point data corresponding to the second union readout signals forms another area range value in the IQ coordinate system. Because the first quantum state and the second quantum state are different quantum states, the second quantum state criteria may be determined based on the area range value corresponding to the first union readout signals and the area range value corresponding to the second union readout signals, and are used to identify the first quantum state and the second quantum state.

Step S204: Associating second quantum state criteria corresponding to target qubits when the respective qubits are used as the target qubits, to obtain the first quantum state criterion.

After the determining, based on the coordinate point data, second quantum state criteria corresponding to the respective qubits, the second quantum state criteria of the N associated qubits need to be associated to obtain the first quantum state criterion.

Figure 5:
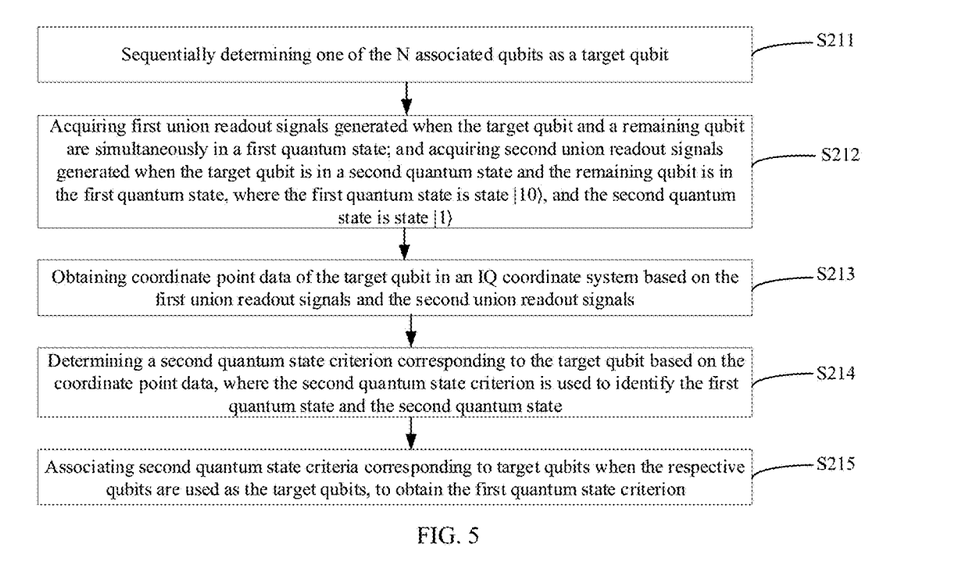
FIG. 5 is a schematic flowchart of another method for establishing a first quantum state criterion for N associated qubits according to an embodiment.

In another example, referring to FIG. 5, another method of establishing a first quantum state criterion for the N associated qubits is further provided, including the following steps.

Step S211: Sequentially determining one of the N associated qubits as a target qubit.

In specific application, during each operation, one of the N associated qubits is determined as the target qubit. It may be understood that, one of the N associated qubits is sequentially determined as the target qubit, and the operation needs to be performed N times. In addition, it should be noted that, the sequentially determining does not mean that the operations are performed according to an arrangement sequence of the N qubits, and a sequence is generally set according to a read task.

Step S212: Acquiring first union readout signals generated when the target qubit and a remaining qubit are simultaneously in a first quantum state; and acquiring second union readout signals generated when the target qubit is in a second quantum state and the remaining qubit is in the first quantum state, where the first quantum state is state $|0\rangle$, and the second quantum state is state $|1\rangle$.

Step S213: Obtaining coordinate point data of the target qubit in an IQ coordinate system based on the first union readout signals and the second union readout signals.

Specifically, IQ orthogonal demodulation processing is performed on the first union readout signals to obtain two corresponding values I and Q, where the two values correspondingly form a set of coordinate point data in the IQ coordinate system.

Similarly, IQ orthogonal demodulation processing is performed on the second union readout signals to obtain two corresponding values I and Q, where the two values correspondingly form a set of coordinate point data in the IQ coordinate system.

Step S214: Determining a second quantum state criterion corresponding to the target qubit based on the coordinate point data, where the second quantum state criterion is used to identify the first quantum state and the second quantum state.

Specifically, after IQ orthogonal demodulation processing is separately performed on the first union readout signals and the second union readout signals, corresponding coordinate point data may be obtained in the IQ coordinate system. Through a large number of repeated tests, a plurality of coordinates in the IQ coordinate system may be obtained. Coordinate point data corresponding to the first union readout signals forms an area range value in the IQ coordinate system, and coordinate point data corresponding to the second union readout signals forms another area range value in the IQ coordinate system. Because the first quantum state and the second quantum state are different quantum states, the second quantum state criterion may be determined based on the area range value corresponding to the first union readout signals and the area range value corresponding to the second union readout signals, and is used to identify the first quantum state and the second quantum state.

Step S215: Associating second quantum state criteria corresponding to target qubits when the respective qubits are used as the target qubits, to obtain the first quantum state criterion.

After the determining, based on the coordinate point data, second quantum state criteria corresponding to the respective qubits, the second quantum state criteria of the N associated qubits need to be associated to obtain the first quantum state criterion.

It should be noted that, a difference between the two methods for establishing a first quantum state criterion for the N associated qubits provided in this embodiment lies in that, during reading and measurement of quantum state information of the N associated qubits, in the first measurement method, a quantum state of a target qubit is exactly the same as that of another qubit, that is, both are a first quantum state and a second quantum state; and in the second measurement method, a target qubit is separately set in a first quantum state and a second quantum state, and another qubit is always in the first quantum state, where the first quantum state is state $|0\rangle$, and the second quantum state is state $|1\rangle$. When a quantum state of the N associated qubits is read simultaneously, readout crosstalk is generated between the N associated qubits. However, it is found by the inventors that, in a case in which there is no readout crosstalk or a case in which readout crosstalk is very small, results of the two methods are basically the same, and both methods are feasible.

For example, the second quantum state criterion is one of a linear straight line equation or a curve equation. In specific application, a qubit readout feedback signal generated when a qubit is in an unknown quantum state is converted into coordinate point data of the IQ coordinate system. As described above, when the N associated qubits are in different quantum states, an area range value of coordinate point data is displayed intuitively in a corresponding IQ coordinate system. A proper equation is set based on different area range values, and thus an area range corresponding to coordinate point data in the IQ coordinate system may be effectively identified, so as to obtain a corresponding quantum state. The coordinate point data is directly compared with a function value of the second quantum state criterion, and it may be determined whether the unknown quantum state is the first quantum state or the second quantum state, which greatly simplifies a qubit quantum state readout process, and ensures a running speed of a quantum computing system that includes a quantum chip and a quantum chip measurement and control system.

Figure 6:
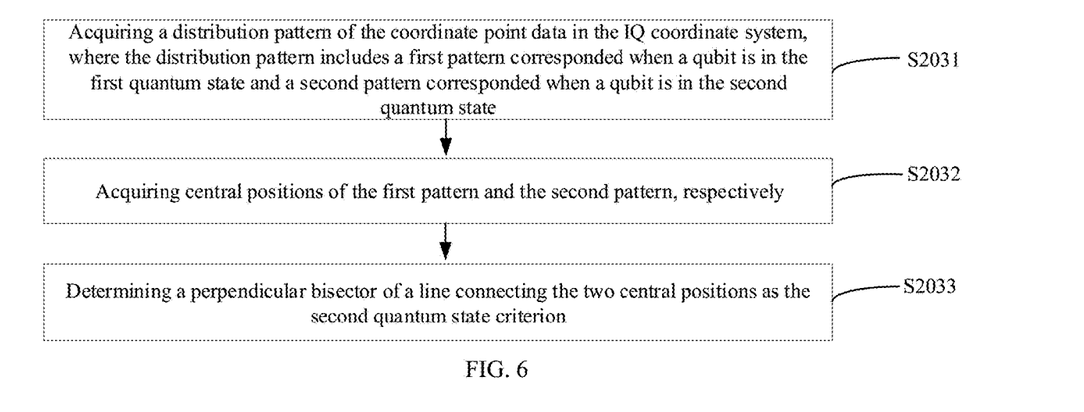
FIG. 6 is a schematic flowchart of a method for determining a second quantum state criterion based on coordinate point data according to an embodiment.

For example, referring to FIG. 6, determining the second quantum state criterion based on the coordinate point data includes the following steps.

Step S2031: Acquiring a distribution pattern of the coordinate point data in the IQ coordinate system, where the distribution pattern includes a first pattern corresponded when a qubit is in the first quantum state and a second pattern corresponded when a qubit is in the second quantum state.

Figure 7:
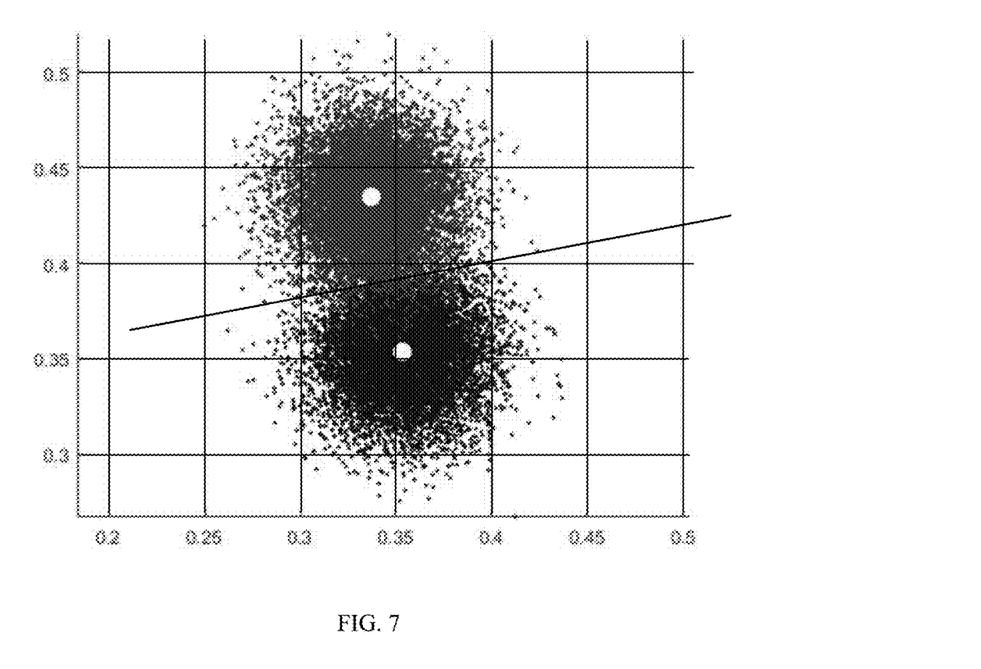
FIG. 7 is a distribution pattern in an IQ coordinate system according to an embodiment.

Referring to FIG. 7, a process of obtaining the distribution pattern may be as follows: repeatedly collecting and measuring readout feedback signals for a specific quantity of times by using a signal collection device with a high sampling rate, and performing parsing and reading, for example, repeatedly collecting and measuring for 5000 times; collecting readout feedback signals of a specific pulse length during each collection and measurement; and parsing out the readout feedback signals and converting the readout feedback signals into coordinate point data in an orthogonal plane coordinate system (namely, an I-Q plane coordinate system). In this way, after 5000 times of sampling, 5000 pieces of corresponding coordinate point data are obtained in the orthogonal plane coordinate system, and patterns formed by 5000 points are the first pattern and the second pattern in the IQ coordinate system.

Step S2032: Acquiring central positions of the first pattern and the second pattern, respectively.

Step S2033: Determining a perpendicular bisector of a line connecting the two central positions as the second quantum state criterion.

Specifically, after the first pattern and the second pattern of the IQ coordinate system are obtained, the inventors of the present application design a method that may be used to effectively distinguish between the first pattern and the second pattern, that is, determining a perpendicular bisector of a line connecting the central positions of the first pattern and the second pattern as the second quantum state criterion, so that the first pattern and the second pattern are symmetrical with respect to the second quantum state criterion, and coordinate point data in the first pattern and the second pattern may be identified more conveniently, that is, a quantum state of a qubit may be identified simply and efficiently.

Figure 8:
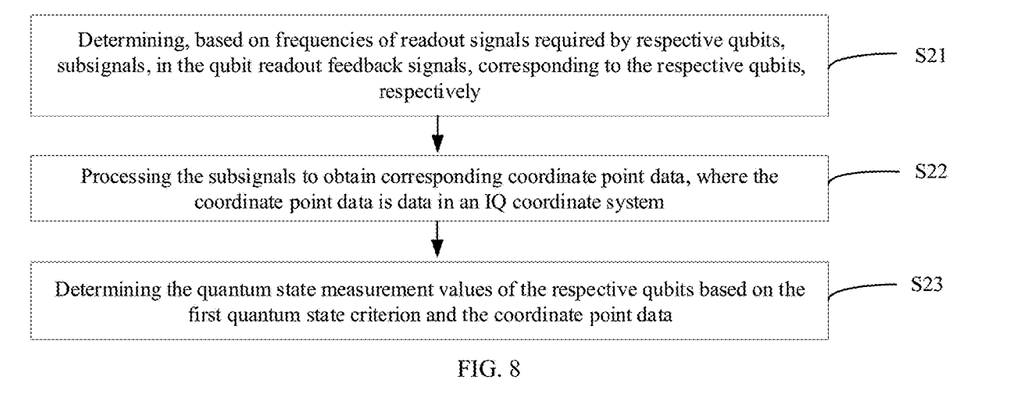
FIG. 8 is a schematic flowchart of a method for obtaining quantum state measurement values of respective qubits based on the qubit readout feedback signals according to an embodiment.

For example, referring to FIG. 8, the acquiring quantum state measurement values of respective qubits based on the qubit readout feedback signals includes the following steps.

Step S21: Determining, based on frequencies of readout signals required by the respective qubits, subsignals, in the qubit readout feedback signals, corresponding to the respective qubits, respectively.

It should be noted that, a working frequency of each qubit on a quantum chip is different, and a working frequency of a readout resonant cavity coupled to the qubit is also different. A frequency of a readout sounding signal required by each qubit needs to correspond to a frequency of a to-be-read qubit and a frequency of a readout resonator, that is, frequencies of readout sounding signals required by respective qubits are also different.

Correspondingly, the obtained qubit readout feedback signals are also mixed-frequency signals that include frequencies of a plurality of qubits, where the mixed-frequency information includes frequencies of respective readout signals, and subsignals respectively corresponding to the respective qubits may be obtained from the mixed-frequency information of the qubit readout feedback signals. During reading of multi-qubit quantum states, subsignals respectively corresponding to the respective qubits need to be first determined, so as to ensure accuracy of reading of the multi-qubit quantum states.

Step S22: Processing the subsignals to obtain corresponding coordinate point data, where the coordinate point data is data in an IQ coordinate system.

Specifically, subsignals of the respective qubits obtained by using the qubit readout feedback signals are analog signals that carry quantum state information of the qubits, and the quantum state information needs to be read from the analog signals. Specifically, IQ orthogonal demodulation processing is performed on the subsignals to obtain two corresponding values I and Q, where the two values correspondingly exist in the IQ coordinate system.

Step S23: Determining the quantum state measurement values of the respective qubits based on the first quantum state criterion and the coordinate point data.

Specifically, after the coordinate point data in the corresponding IQ coordinate system is obtained by using the qubit readout feedback signals, quantum state information, namely, the quantum state measurement values of the respective qubits, corresponding to the qubit readout feedback signals may be efficiently obtained based on the first quantum state criterion set in the IQ coordinate system.

Figure 9:
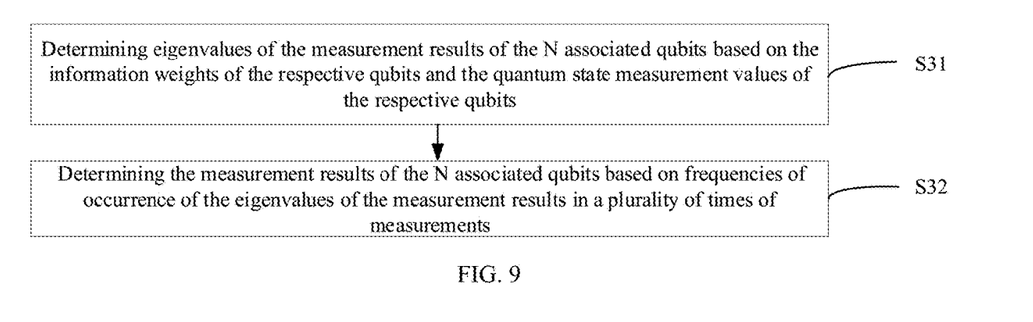
FIG. 9 is a schematic flowchart of a method for determining measurement results of N associated qubits based on information weights of the respective qubits and quantum state measurement values of the respective qubits according to an embodiment.

For example, referring to FIG. 9, the determining measurement results of the N associated qubits based on information weights of the respective qubits and the quantum state measurement values of the respective qubits includes the following steps.

Step S31: Determining eigenvalues of the measurement results of the N associated qubits based on the information weights of the respective qubits and the quantum state measurement values of the respective qubits.

Step S32: Determining the measurement results of the N associated qubits based on frequencies of occurrence of the eigenvalues of the measurement results in a plurality of times of measurements.

The information weights of the respective qubits are set based on a bit of the qubits. For example, when a value of N is 3, a set of three qubits needs to be obtained and used as a first bit. To reduce occupation of computing resources, three first qubits q3q2q1 are preferred. It should be understood that, a total of eight eigenvalues of q3q2q1 are acquired, from |000⟩ to |111⟩, a sum of squares of amplitudes of all eigenvalues is 1, and a specific distribution is not limited.

A plurality of times of measurements are performed on the N associated qubits to obtain a plurality of corresponding measurement results, statistics on probabilities of occurrence of the eigenvalues of the measurement results in the plurality of times of measurements are collected, and an accuracy degree of the measurement results is determined by comparing the probabilities of the eigenvalues of the measurement results.

Figure 10:
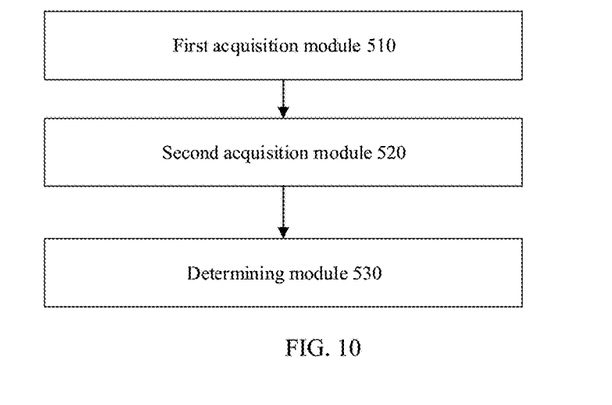
FIG. 10 is a block diagram of an apparatus for determining a multi-qubit measurement result according to an embodiment.

Similarly, an embodiment provides an apparatus for determining a multi-qubit measurement result. Referring to FIG. 10, the determining apparatus includes: a first acquisition module 510, configured to acquire qubit readout feedback signals for N associated qubits, where N is an integer greater than or equal to 2; a second acquisition module 520, configured to acquire quantum state measurement values of the respective qubits based on the qubit readout feedback signals; and a determining module 530, configured to determine measurement results of the N associated qubits based on information weights of the respective qubits and the quantum state measurement values of the respective qubits.

Herein, a method and an apparatus for determining a multi-qubit measurement result, and a quantum computer are further provided, to improve accuracy of the multi-qubit measurement result by correcting fidelity and correcting the measurement result based on the corrected fidelity, so that a plurality of associated qubits may be applied, which has higher practicability and wider application scenarios.

Figure 11:
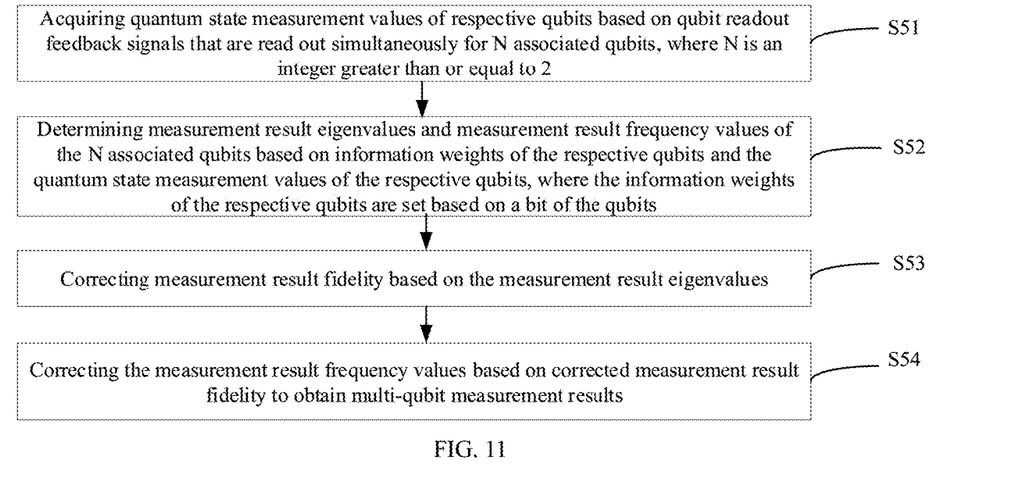
FIG. 11 is a schematic flowchart of a method for determining a multi-qubit measurement result according to an embodiment.

Therefore, a method for determining a multi-qubit measurement result is provided herein. Referring to FIG. 11, the determining method includes the following steps.

Step S51: Acquiring quantum state measurement values of respective qubits based on qubit readout feedback signals that are read out simultaneously for N associated qubits, where N is an integer greater than or equal to 2.

The qubit readout feedback signals are obtained from a readout signal transmission line, and represent signals of measurement results for the N associated qubits. It should be noted that, the qubit readout feedback signals are analog signals, and a form of the analog signals includes but is not limited to:

$$S = A\cos(\omega t + \varphi) = \frac{A}{2}\left[e^{-i(\omega t + \varphi)} + e^{-(\omega t + \varphi)}\right].$$

A person skilled in the art may understand that the form is a general representation of the analog signal, and therefore, parameters in the representation is not described herein. Digital processing, including but not limited to frequency mixing and/or integration processing, is performed on the signals to obtain corresponding complex signals that include a quantum state.

Specifically, the qubit readout feedback signals carry quantum state information of the N associated qubits. Different qubits require different frequencies of readout sounding signals, and different qubits have different responses to readout sounding signals that are applied to readout cavities corresponding to the qubits. Therefore, compared with a readout feedback signal for a conventional single qubit, the qubit readout feedback signals for the N associated qubits include more information, and the information is more complicated. During reading and measurement of the quantum state information, the qubit readout feedback signals are processed to obtain the quantum state measurement values of the N associated qubits. In this embodiment, an example in which Nis equal to 3 is used, that is, determining measurement results of three qubits. In this case, the qubit readout feedback signals include quantum state information of three associated qubits. After signal processing, the quantum state measurement values of the three associated qubits may be obtained.

Step S52: Determining measurement result eigenvalues and measurement result frequency values of the N associated qubits based on information weights of the respective qubits and the quantum state measurement values of the respective qubits, where the information weights of the respective qubits are set based on a bit of the qubits.

For example, when a value of N is 3, a set of three qubits needs to be obtained and used as a first bit. To reduce occupation of computing resources, three first qubits q3q2q1 are preferred. It should be understood that, a total of eight measurement result eigenvalues from 0 to 7 of q3q2q1 are acquired, a sum of squares of amplitudes of all eigenvalues is 1, and a specific distribution is not limited. A measurement result frequency value corresponding to each eigenvalue may be obtained by means of a large quantity of repeated tests. It should be understood that, the measurement result frequency value corresponding to each eigenvalue is a ratio of a quantity of times that the eigenvalue appears to a total quantity of tests.

Step S53: Correcting measurement result fidelity based on the measurement result eigenvalues.

Specifically, a quantum state of each of three associated qubits corresponding to each measurement result eigenvalue is determined based on the respective measurement result eigenvalues. Then fidelity of the respective measurement result eigenvalues is obtained based on the quantum state. A fidelity matrix of 8*8 is formed by eight fidelity values and a frequency value of another interference measurement result (indicating an existing another measurement result that is different from the measurement result eigenvalue), that is, the fidelity of the measurement results is corrected.

Fidelity is a parameter that represents a degree of similarity between an input signal and an output signal obtained by reproducing the input signal and output by an electronic device. In the field of quantum measurement and control and quantum computing, the higher the fidelity, the more accurate the results of quantum measurement and control and quantum computing.

It should be noted that, in this embodiment, a quantum state of the qubits may include only two eigenstates of the qubits, namely, state |0⟩ and state |1⟩.

Step S54: Correcting the measurement result frequency values based on corrected measurement result fidelity to obtain multi-qubit measurement results.

Specifically, as described above, after a fidelity matrix is known, an inverse matrix is obtained, and the inverse matrix is multiplied by the measurement result frequency values, so that the measurement result frequency values may be corrected to obtain the multi-qubit measurement results with high accuracy.

A mathematical principle of the foregoing correction is as follows: a measurement result frequency value is M, a fidelity matrix is F, and a multi-qubit measurement result is Result. It may be learned from the foregoing that M is an 8*1 matrix, F is an 8*8 matrix, and Result is an 8*1 matrix.

When quantum state measurement is performed on the N associated qubits, crosstalk exists between the qubits, and actual measurement result frequency values are affected, which may be represented by the following formula:

$$M = F \cdot \text{Result}$$

$F^{-1} \cdot F = I$, where $F^{-1}$ is an inverse matrix of F.

Therefore, to obtain more accurate multi-qubit measurement results, Result may be obtained through calculation by using the following formula:

$$\text{Result} = F^{-1} \cdot M$$

Figure 12:
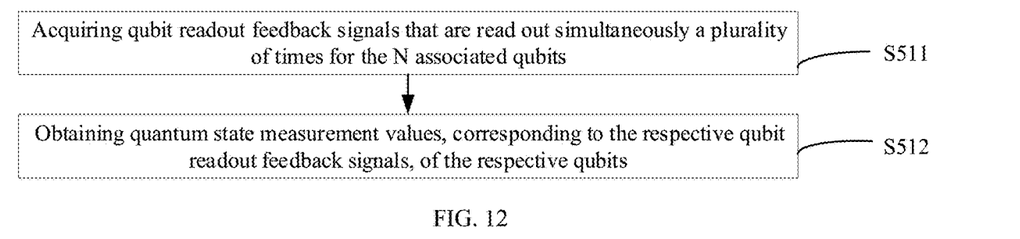
FIG. 12 is a schematic flowchart of acquiring quantum state measurement values of respective qubits based on qubit readout feedback signals that are read out simultaneously for N associated qubits according to an embodiment.

For example, referring to FIG. 12, the acquiring quantum state measurement values of respective qubits based on qubit readout feedback signals that are read out simultaneously for N associated qubits includes the following steps.

Step S511: Acquiring the qubit readout feedback signals that are read out simultaneously a plurality of times for the N associated qubits.

Specifically, in specific implementation of the inventors, quantum state control signals are first applied to the N associated qubits simultaneously, so that each qubit is in a first quantum state or a second quantum state, and quantum state information of each qubit is read out to obtain a corresponding qubit readout feedback signal.

Step S512: Obtaining quantum state measurement values, corresponding to the respective qubit readout feedback signals, of the respective qubits.

Specifically, the qubit readout feedback signals carry quantum state information of the N associated qubits. Different qubits require different frequencies of readout sounding signals, and different qubits have different responses to readout sounding signals that are applied to readout cavities corresponding to the qubits. Therefore, compared with a readout feedback signal for a conventional single qubit, the qubit readout feedback signals for the N associated qubits include more information, and the information is more complicated. During reading and measurement of the quantum state information, the qubit readout feedback signals are processed to obtain the quantum state measurement values of the N associated qubits.

Figure 13:
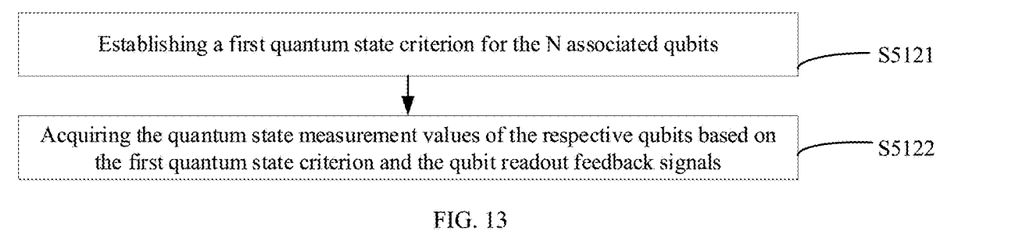
FIG. 13 is a schematic flowchart of obtaining quantum state measurement values, corresponding to the respective qubit readout feedback signals, of the respective qubits according to an embodiment.

For example, referring to FIG. 13, the obtaining quantum state measurement values, corresponding to the respective qubit readout feedback signals, of the respective qubits includes the following steps.

Step S5121: Establishing a first quantum state criterion for N associated qubits.

The first quantum state criterion is used to acquire the quantum state measurement values of the respective qubits based on the qubit readout feedback signals.

The inventors find that a specific step of performing quantum state resolution on qubit readout feedback signals that include quantum state information may be implemented by establishing a first quantum state criterion. Specifically, carrier pulse signals (readout sounding signals) are applied to qubits, and qubit readout feedback signals output by a readout signal transmission line are measured to obtain corresponding quantum state information and the corresponding quantum state information is recorded. By applying different carrier pulse signals (readout sounding signals) and repeating the process, measurement results that can represent the respective qubit readout feedback signals are obtained, and the first quantum state criterion is generated based on the measurement results.

In specific application, as long as a collected qubit feedback signal is input into the first quantum state criterion, quantum state information corresponding to the qubit feedback signal may be obtained, so that a resolution process for multi-qubit quantum states is implemented, reducing quantum computing steps and improving quantum computing efficiency.

Step S5122: Acquiring the quantum state measurement values of the respective qubits based on the first quantum state criterion and the qubit readout feedback signals.

Subsignals, corresponding to the respective qubits respectively, in the qubit readout feedback signals, are first determined based on frequencies of readout signals required by the respective qubits.

It should be noted that, a working frequency of each qubit on a quantum chip is different, and a working frequency of a readout resonant cavity coupled to the qubit is also different. A frequency of a readout sounding signal required for reading each qubit needs to correspond to a frequency of a to-be-read qubit and a frequency of a readout resonator, that is, frequencies of readout sounding signals required by respective qubits are also different.

Correspondingly, the obtained qubit readout feedback signals are also mixed-frequency signals that include frequencies of a plurality of qubits, where the mixed-frequency information includes frequencies of respective readout signals, and subsignals respectively corresponding to the respective qubits may be obtained from the mixed-frequency information of the qubit readout feedback signals. During reading of multi-qubit quantum states, subsignals respectively corresponding to the respective qubits need to be first determined, so as to ensure accuracy of reading of the multi-qubit quantum states.

Then, subsignals of the respective qubits obtained by using the qubit readout feedback signals are analog signals that carry quantum state information of the qubits, and the quantum state information needs to be read from the analog signals. Specifically, IQ orthogonal demodulation processing is performed on the subsignals to obtain two corresponding values I and Q, where the two values correspondingly exist in the IQ coordinate system.

Finally, after coordinate point data in the corresponding IQ coordinate system is obtained by using the qubit readout feedback signals, quantum state information, namely, quantum state measurement values of the respective qubits, corresponding to the qubit readout feedback signals may be efficiently obtained based on the first quantum state criterion set in the IQ coordinate system.

Figure 14:
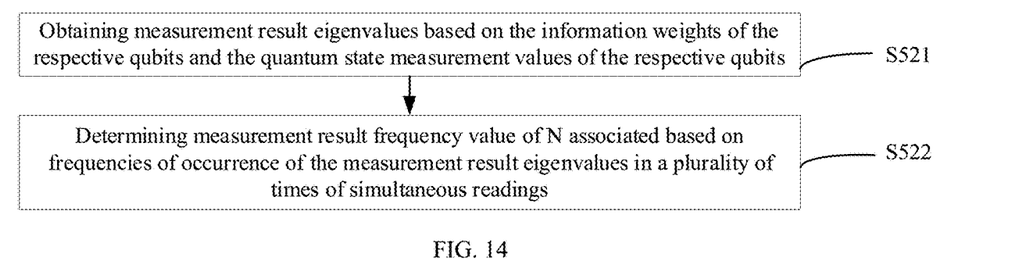
FIG. 14 is a schematic flowchart of determining measurement result eigenvalues and measurement result frequency values of N associated qubits according to an embodiment.

For example, referring to FIG. 14, the determining measurement result eigenvalues and measurement result frequency values of the N associated qubits based on information weights of the respective qubits and the quantum state measurement values of the respective qubits includes the following steps.

Step S521: Obtaining the measurement result eigenvalues based on the information weights of the respective qubits and the quantum state measurement values of the respective qubits.

Step S522: Determining measurement result frequency value of N associated based on frequencies of occurrence of the measurement result eigenvalues in a plurality of times of simultaneous readings.

The qubit information weights are set based on a bit of the qubits. For example, when a value of N is 3, a set of three qubits needs to be obtained and used as a first bit. To reduce occupation of computing resources, three first qubits q3q2q1 are preferred. It should be understood that, a total of eight eigenvalues from 0 to 7 of q3q2q1 are acquired, a sum of squares of amplitudes of all eigenvalues is 1, and a specific distribution is not limited.

A plurality of times of measurements are performed on the N associated qubits to obtain a plurality of corresponding measurement results, and statistics on probabilities of occurrence of the eigenvalues of the measurement results in the plurality of times of measurements are collected, to obtain the measurement result frequency values.

Figure 15:
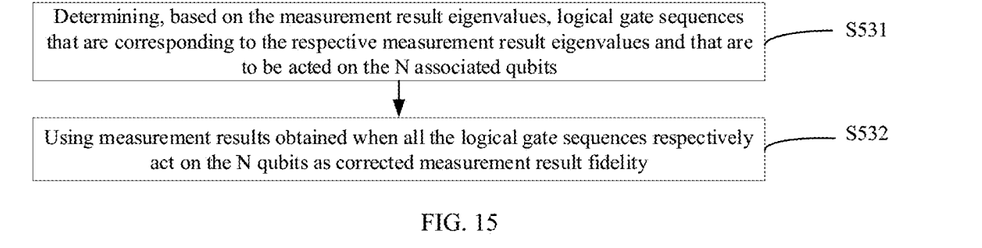
FIG. 15 is a schematic flowchart of correcting measurement result fidelity according to an embodiment.

For example, referring to FIG. 15, the correcting measurement result fidelity based on the measurement result eigenvalues includes the following steps.

Step S531: Determining, based on the measurement result eigenvalues, logical gate sequences that are corresponding to the respective measurement result eigenvalues and that are to be acted on the N associated qubits.

Specifically, a quantum state of each qubit in the N associated qubits of each measurement result eigenvalue is separately determined based on the respective measurement result eigenvalues, then a logical gate sequence corresponding to each measurement result eigenvalue and to be acted on the N associated qubits is determined based on the quantum state, and finally, logical gate sequences corresponding to $2^N$ measurement result eigenvalues and to be acted on the N associated qubits are respectively obtained.

Step S532: Using measurement results obtained when all the logical gate sequences respectively act on the N qubits as corrected measurement result fidelity.

For example, when a value of N in this embodiment is 3, it may be learned from the foregoing that eight measurement result eigenvalues are obtained, eight logical gate sequences corresponding to the eight measurement result eigenvalues and to be acted on three associated qubits are obtained, and the eight logical gate sequences are sequentially added to the three associated qubits corresponding to the eight logical gate sequences. In this way, fidelity of logical gate sequences respectively corresponding to the measurement result eigenvalues may be obtained. A fidelity matrix of 8*8 is formed by eight fidelity values and a frequency value of another interference measurement result (indicating an existing another measurement result that is different from the measurement result eigenvalue), that is, the fidelity of the measurement results is corrected.

Figure 16:
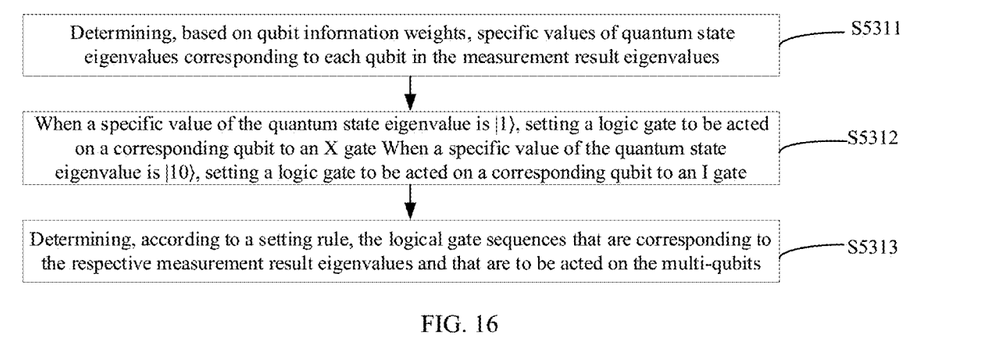
FIG. 16 is a schematic flowchart of determining logical gate sequences that are to be acted on the plurality of qubits according to an embodiment.

For example, referring to FIG. 16, the determining, based on the measurement result eigenvalues, logical gate sequences that are corresponding to the respective measurement result eigenvalues and that are to be acted on the multi-qubits includes the following steps.

Step S5311: Determining, based on qubit information weights, specific values of quantum state eigenvalues corresponding to each qubit in the measurement result eigenvalues.

In this embodiment, an example in which N is 3 is used. To reduce occupation of computing resources, three first qubits q3q2q1 are preferred. In this case, eight eigenvalues from 0 to 7 of q3q2q1 are obtained. Correspondingly, there are also eight groups of specific values of quantum eigenstate corresponding to each qubit in q3q2q1, from |000⟩ to |111⟩. A correspondence is shown in the following table:

| | Qubit | | | |
|---|---|---|---|---|
| | q2 | q1 | q0 | |
| | Qubit information weight | | | |
| | 4 | 2 | 1 | Eigenvalue |
| Specific value of quantum eigenstate | 0 | 0 | 0 | 0 |
| | 0 | 0 | 1 | 1 |
| | 0 | 1 | 0 | 2 |
| | 0 | 1 | 1 | 3 |
| | 1 | 0 | 0 | 4 |
| | 1 | 0 | 1 | 5 |
| | 1 | 1 | 0 | 6 |
| | 1 | 1 | 1 | 7 |

Step S5312: When a specific value of the quantum state eigenvalue is |1⟩, setting a logic gate to be acted on a corresponding qubit to an X gate; when a specific value of the quantum state eigenvalue is |0⟩, setting a logic gate to be acted on a corresponding qubit to an I gate.

Step S5313: Determining, according to a setting rule, the logical gate sequences that are corresponding to the respective measurement result eigenvalues and that are to be acted on the multi-qubits.

Specifically, eight groups of logical gate sequences that are corresponding to the respective measurement result eigenvalues and that are to be acted on the multi-qubits may be obtained based on the specific values of quantum eigenstate corresponding to each qubit in q3q2q1. Details are shown in the following table:

| Qubit | Logic gate | | | | | | | |
|---|---|---|---|---|---|---|---|---|
| q0 | I | X | I | X | I | X | I | X |
| q1 | I | I | X | X | I | I | X | X |
| q2 | I | I | I | I | X | X | X | X |

In specific application, the logical gate sequences are correspondingly added to the three associated qubits one by one according to a correspondence between the foregoing two tables, so as to obtain fidelity of logical gate sequences corresponding to the respective measurement result eigenvalues.

Figure 17:
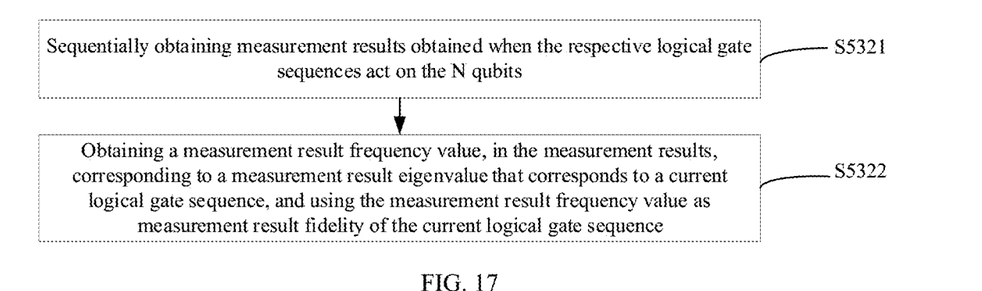
FIG. 17 is a schematic flowchart of obtaining corrected measurement result fidelity according to an embodiment.

For example, referring to FIG. 17, the using measurement results obtained when all the logical gate sequences respectively act on the N qubits as corrected measurement result fidelity includes the following steps.

Step S5321: Sequentially obtaining measurement results obtained when the respective logical gate sequences act on the N qubits.

Step S5322: Obtaining a measurement result frequency value, in the measurement results, corresponding to a measurement result eigenvalue that corresponds to a current logical gate sequence, and using the measurement result frequency value as measurement result fidelity of the current logical gate sequence.

Specifically, an example in which N is 3 is used. Three first qubits q3q2q1 are preferred, and a total of eight eigenvalues from 0 to 7 of q3q2q1 are obtained. For example, fidelity measurement is performed on one of the measurement result eigenvalues 1. In this case, it may be learned from the foregoing that a set of specific values of quantum eigenstates corresponding to each qubit in q3q2q1 is |001⟩, and a corresponding logical gate sequence is IIX. During measurement, a logic gate I is added to the qubit q2, a logic gate I is added to the qubit q1, and a logic gate X is added to the qubit q0, so that a set of measurement results is generated, and a prepared measurement result is state |001⟩. A total of 1000 groups of measurement data is obtained. After confirmation, it is learned that a total of 750 groups of measurement data in these groups of measurement data are marked with state |001⟩, and 250 groups of measurement data in these groups of measurement data are marked with another state (including seven states |000⟩, |010⟩ to |111⟩). Therefore, measurement result fidelity of the current logic gate sequence (IIX) is 75%.

Similarly, a same operation may also be performed on the other seven measurement result eigenvalues to obtain fidelity of corresponding logic gates, and details are not described herein again. Finally, a fidelity matrix of 8*8 is formed by eight fidelity values and a frequency value of another interference measurement result (indicating an existing another measurement result that is different from the measurement result eigenvalue), that is, the fidelity of the measurement results is corrected.

In this embodiment, the inventors further provide a set of complete experimental data for measuring fidelity of each logical gate sequence according to the foregoing method, as shown in the following table:

| Eigenvalue | Frequency value | | | | | | | |
|---|---|---|---|---|---|---|---|---|
| | Frequency occurrence 0 | Frequency occurrence 1 | Frequency occurrence 2 | Frequency occurrence 3 | Frequency occurrence 4 | Frequency occurrence 5 | Frequency occurrence 6 | Frequency occurrence 7 |
| 0 | 0.88 | 0.03 | 0.02 | 0.02 | 0.01 | 0.02 | 0.01 | 0.01 |
| 1 | 0.04 | 0.75 | 0.06 | 0.06 | 0.02 | 0.02 | 0.03 | 0.02 |
| 2 | 0.04 | 0.12 | 0.65 | 0.08 | 0.02 | 0.04 | 0.02 | 0.03 |
| 3 | 0.06 | 0.04 | 0.12 | 0.59 | 0.08 | 0.04 | 0.04 | 0.03 |
| 4 | 0.03 | 0.02 | 0.02 | 0.06 | 0.79 | 0.03 | 0.02 | 0.03 |
| 5 | 0.02 | 0.02 | 0.03 | 0.02 | 0.03 | 0.83 | 0.03 | 0.02 |
| 6 | 0.08 | 0.02 | 0.04 | 0.02 | 0.06 | 0.06 | 0.64 | 0.08 |
| 7 | 0.14 | 0.06 | 0.06 | 0.06 | 0.08 | 0.12 | 0.18 | 0.3 |

It should be understood that, values in the diagonal line in the foregoing table are a set of specific experimental values of fidelity of logical gate sequences corresponding to respective measurement result eigenvalues, and a required fidelity matrix F of 8*8 is formed by using all measurement frequency values in the foregoing table.

Subsequently, the measurement result frequency values are corrected by using the fidelity F. An inverse matrix is first obtained, and then the inverse matrix is multiplied by the measurement result frequency values, so that the measurement result frequency values may be corrected to obtain multi-qubit measurement results with high accuracy. For a mathematical principle of this correction, refer to the foregoing description. Details are not described herein again.

Figure 18:
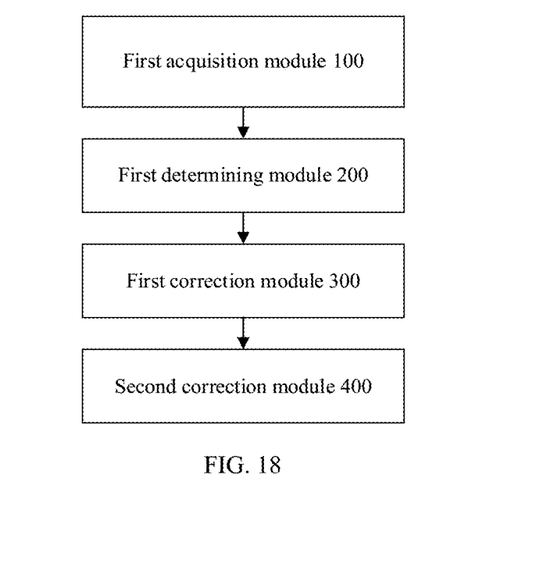
FIG. 18 is a structural diagram of an apparatus for determining a multi-qubit measurement result according to an embodiment.

Similarly, an embodiment further provides an apparatus for determining a multi-qubit measurement result. Referring to FIG. 18, the determining apparatus includes: a first acquisition module 100, configured to acquire quantum state measurement values of respective qubits based on qubit readout feedback signals that are read out simultaneously for N associated qubits, where N is an integer greater than or equal to 2; a first determining module 200, configured to determine measurement result eigenvalues and measurement result frequency values of the N associated qubits based on information weights of the respective qubits and the quantum state measurement values of the respective qubits, where the information weights of the respective qubits are set based on a bit of the qubits; a first correction module 300, configured to correct measurement result fidelity based on the measurement result eigenvalues; and a second correction module 400, configured to correct the measurement result frequency values based on corrected measurement result fidelity to obtain multi-qubit measurement results.

Similarly, an embodiment further provides a storage medium, where the storage medium stores a computer program. When the computer program is set to run, the method described below is performed.

Step S51: Acquiring quantum state measurement values of respective qubits based on qubit readout feedback signals that are read out simultaneously for N associated qubits, where N is an integer greater than or equal to 2.

Step S52: Determining measurement result eigenvalues and measurement result frequency values of the N associated qubits based on information weights of the respective qubits and the quantum state measurement values of the respective qubits, where the information weights of the respective qubits are set based on a bit of the qubits.

Step S53: Correcting measurement result fidelity based on the measurement result eigenvalues.

Step S54: Correcting the measurement result frequency values based on corrected measurement result fidelity to obtain multi-qubit measurement results.

In addition, similarly, an embodiment provides a quantum computer, configured to perform quantum computing by using the foregoing method for determining a multi-qubit measurement result, or including the foregoing apparatus for determining a multi-qubit measurement result.

A method and an apparatus for determining a multi-qubit measurement result, and a quantum computer are provided in different embodiments, so that measurement results of a plurality of associated qubits may be determined, and the plurality of associated qubits may be applied, improving practicality of the plurality of associated qubits and expanding application scenarios of the plurality of associated qubits.

A method and an apparatus for determining a multi-qubit measurement result, and a quantum computer are provided in different embodiments, so that accuracy of the multi-qubit measurement result may be improved by correcting fidelity and correcting the measurement results based on the fidelity, and a plurality of associated qubits may be applied, having higher practicability and wider application scenarios.

The foregoing description is merely a description of the preferred embodiments of the present disclosure, and is not intended to limit the scope of the present disclosure. Any change or modification made by a person of ordinary skill in the art according to the foregoing disclosure falls within the protection scope of the claims.

What is claimed is:
1. A method for determining a multi-qubit measurement result, comprising:
   acquiring qubit readout feedback signals for N associated qubits, wherein N is an integer greater than or equal to 2;
   acquiring quantum state measurement values of the respective qubits based on the qubit readout feedback signals; and
   determining measurement results of the N associated qubits based on information weights of the respective qubits and the quantum state measurement values of the respective qubits;
   wherein the determining measurement results of the N associated qubits based on information weights of the respective qubits and the quantum state measurement values of the respective qubits comprises:
   determining eigenvalues of the measurement results of the N associated qubits based on the information weights of the respective qubits and the quantum state measurement values of the respective qubits; and
   determining the measurement results of the N associated qubits based on frequencies of occurrence of the eigenvalues of the measurement results in a plurality of times of measurements, wherein the acquiring qubit readout feedback signals for N associated qubits comprises:

simultaneously reading the qubit readout feedback signals for the N associated qubits, wherein the determining measurement results of the N associated qubits based on information weights of the respective qubits and the quantum state measurement values of the respective qubits comprises:

determining measurement result eigenvalues and measurement result frequency values of the N associated qubits based on the information weights of the respective qubits and the quantum state measurement values of the respective qubits, wherein the information weights of the respective qubits are set based on a bit of the qubits;

correcting measurement result fidelity based on the measurement result eigenvalues; and correcting the measurement result frequency values based on corrected measurement result fidelity to obtain multi-qubit measurement results, wherein the correcting measurement result fidelity based on the measurement result eigenvalues comprises:

determining, based on the measurement result eigenvalues, logical gate sequences that are corresponding to the respective measurement result eigenvalues and that are to be acted on the N associated qubits; and using measurement results obtained when all the logical gate sequences respectively act on the N qubits as corrected measurement result fidelity, the determining, based on the measurement result eigenvalues, logical gate sequences that are corresponding to the respective measurement result eigenvalues and that are to be acted on the multi-qubits comprises:

determining, based on qubit information weights, specific values of quantum state eigenvalues corresponding to each qubit in the measurement result eigenvalues;

when a specific value of the quantum state eigenvalue is |1⟩, setting a logic gate to be acted on a corresponding qubit to an X gate;

when a specific value of the quantum state eigenvalue is |0⟩, setting a logic gate to be acted on a corresponding qubit to an I gate; and determining, according to a setting rule, the logical gate sequences that are corresponding to the respective measurement result eigenvalues and that are to be acted on the multi-qubits.

2. The method for determining a multi-qubit measurement result according to claim 1, wherein before the acquiring quantum state measurement values of the respective qubits based on the qubit readout feedback signals, the method further comprises:

establishing a first quantum state criterion for the N associated qubits, wherein the first quantum state criterion is used to acquire the quantum state measurement values of the respective qubits based on the qubit readout feedback signals.

3. The method for determining a multi-qubit measurement result according to claim 2, wherein the establishing a first quantum state criterion for the N associated qubits comprises:

acquiring first union readout signals generated when the N associated qubits are simultaneously in a first quantum state;

acquiring second union readout signals generated when the N associated qubits are simultaneously in a second quantum state;

obtaining coordinate point data of the respective qubits in an IQ coordinate system based on the first union readout signals and the second union readout signals;

determining, based on the coordinate point data, second quantum state criteria corresponding to the respective qubits, wherein the second quantum state criteria are used to identify the first quantum state and the second quantum state; and associating the second quantum state criteria corresponding to the respective qubits to obtain the first quantum state criterion.

4. The method for determining a multi-qubit measurement result according to claim 3, wherein the second quantum state criterion is one of a linear straight line equation or a curve equation.

5. The method for determining a multi-qubit measurement result according to claim 3, wherein the determining a second quantum state criterion based on the coordinate point data comprises:

acquiring a distribution pattern of the coordinate point data in the IQ coordinate system, wherein the distribution pattern comprises a first pattern corresponded when a qubit is in the first quantum state and a second pattern corresponded when a qubit is in the second quantum state;

acquiring central positions of the first pattern and the second pattern, respectively; and determining a perpendicular bisector of a line connecting the two central positions as the second quantum state criterion.

6. The method for determining a multi-qubit measurement result according to claim 2, wherein the establishing a first quantum state criterion for the N associated qubits comprises:

sequentially determining one of the N associated qubits as a target qubit;

acquiring first union readout signals generated when the target qubit and a remaining qubit are simultaneously in a first quantum state;

acquiring second union readout signals generated when the target qubit is in a second quantum state and the remaining qubit is in the first quantum state, wherein the first quantum state is state |0⟩, and the second quantum state is state |1⟩;

obtaining coordinate point data of the target qubit in an IQ coordinate system based on the first union readout signals and the second union readout signals;

determining a second quantum state criterion corresponding to the target qubit based on the coordinate point data, wherein the second quantum state criterion is used to identify the first quantum state and the second quantum state; and associating second quantum state criteria corresponding to target qubits when the respective qubits are used as the target qubits, to obtain the first quantum state criterion.

7. The method for determining a multi-qubit measurement result according to claim 2, wherein the acquiring quantum state measurement values of the respective qubits based on the qubit readout feedback signals comprises:

determining, based on frequencies of readout signals required by the respective qubits, subsignals, in the qubit readout feedback signals, corresponding to the respective qubits, respectively;

processing the subsignals to obtain corresponding coordinate point data, wherein the coordinate point data is data in an IQ coordinate system; and determining the quantum state measurement values of the respective qubits based on the first quantum state criterion and the coordinate point data.

8. The method for determining a multi-qubit measurement result according to claim 1, wherein acquiring the quantum state measurement values of the respective qubits based on the qubit readout feedback signals that are read out simultaneously for the N associated qubits comprises:
   acquiring the qubit readout feedback signals that are read out simultaneously a plurality of times for the N associated qubits; and
   obtaining quantum state measurement values, corresponding to the respective qubit readout feedback signals, of the respective qubits.

9. The method for determining a multi-qubit measurement result according to claim 8, wherein the obtaining quantum state measurement values, corresponding to the respective qubit readout feedback signals, of the respective qubits comprises:
   establishing a first quantum state criterion for the N associated qubits; and
   acquiring the quantum state measurement values of the respective qubits based on the first quantum state criterion and the qubit readout feedback signals.

10. The method for determining a multi-qubit measurement result according to claim 8, wherein the determining measurement result eigenvalues and measurement result frequency values of the N associated qubits based on the information weights of the respective qubits and the quantum state measurement values of the respective qubits comprises:
   obtaining the measurement result eigenvalues based on the information weights of the respective qubits and the quantum state measurement values of the respective qubits; and
   determining N associated measurement result frequency values based on frequencies of occurrence of the measurement result eigenvalues in a plurality of times of simultaneous readings.

11. The method for determining a multi-qubit measurement result according to claim 1, wherein the using measurement results obtained when all the logical gate sequences respectively act on the N qubits as corrected measurement result fidelity comprises:
   sequentially obtaining measurement results obtained when the respective logical gate sequences act on the N qubits; and
   obtaining a measurement result frequency value, in the measurement results, corresponding to a measurement result eigenvalue that corresponds to a current logical gate sequence, and using the measurement result frequency value as measurement result fidelity of the current logical gate sequence.

* * * * *